(12) United States Patent
Zamprogno et al.

(10) Patent No.: US 9,627,879 B2
(45) Date of Patent: Apr. 18, 2017

(54) CIRCUIT PROTECTION

(75) Inventors: Marco Zamprogno, Monza E Brianza (IT); Alberto Minuti, Piacenza (IT); Germano Nicollini, Piacenza (IT)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 140 days.

(21) Appl. No.: 13/990,936

(22) PCT Filed: Dec. 2, 2011

(86) PCT No.: PCT/EP2011/071625
§ 371 (c)(1),
(2), (4) Date: Aug. 15, 2013

(87) PCT Pub. No.: WO2012/072797
PCT Pub. Date: Jun. 7, 2012

(65) Prior Publication Data
US 2013/0314830 A1 Nov. 28, 2013

Related U.S. Application Data

(60) Provisional application No. 61/514,635, filed on Aug. 3, 2011.

(30) Foreign Application Priority Data

Dec. 2, 2010 (EP) .................................... 10425368

(51) Int. Cl.
*H02H 3/20* (2006.01)
*H02J 1/10* (2006.01)
(Continued)

(52) U.S. Cl.
CPC .............. *H02H 3/20* (2013.01); *H02H 3/207* (2013.01); *H02J 1/10* (2013.01); *H02J 7/0031* (2013.01); *H02J 7/345* (2013.01)

(58) Field of Classification Search
CPC ... H02H 3/20; H02H 3/207; H02J 1/10; H02J 7/0031; H02J 7/345
(Continued)

(56) References Cited

U.S. PATENT DOCUMENTS 4,005,344 A    1/1977   Gaind et al.
4,713,555 A *  12/1987  Lee .......................... H02J 9/061
                                                          307/150
(Continued)

FOREIGN PATENT DOCUMENTS

EP    1 220 451 A1    7/2002
WO    2008/065471 A1  6/2008

OTHER PUBLICATIONS

International Search Report and Written Opinion issued in corresponding International application No. PCT/EP2011/071625, date of mailing Feb. 27, 2012.

*Primary Examiner* — Ann Hoang
(74) *Attorney, Agent, or Firm* — The Danamraj Law Group, P.C.; Thomas L. Crisman; Kenneth A. McClure

(57) ABSTRACT

An apparatus (100) for protecting a circuit (200) from an input volume comprises a switchable element (10) arranged to couple the input voltage ($V_{IN}$) to the circuit (200) in response to a first control signal (DRV1) having a first value and to decouple the input voltage ($V_{IN}$) from the circuit (200) in response to the first control signal (DRV1) having a second value. A monitor stage (20) compares a monitored voltage ($V_{MON}$) to a threshold ($V_{TH}$). A controller (30) provides the first control signal (DRV1) to the switchable element (10), the first control signal (DRV1) having the first value when the monitored voltage ($V_{MON}$) is on one side of the threshold ($V_{TH}$) and the second value when the monitored voltage ($V_{MON}$) is on the other side of the threshold ($V_{TH}$), wherein the first value is independent of the input voltage ($V_{IN}$) and the second value is equal to the input voltage ($V_{IN}$).

20 Claims, 10 Drawing Sheets

(51) Int. Cl.
*H02J 7/00* (2006.01)
*H02J 7/34* (2006.01)

(58) Field of Classification Search
USPC .............................................. 361/90, 91.1–6
See application file for complete search history.

(56) References Cited

U.S. PATENT DOCUMENTS

| | | |
|---|---|---|
| 6,100,719 A | 8/2000 | Graves et al. |
| 7,245,159 B2 | 7/2007 | Dhong et al. |
| 2004/0080340 A1* | 4/2004 | Hidaka ................. G11C 5/147 326/83 |
| 2005/0052812 A1 | 3/2005 | Ganton et al. |
| 2005/0127944 A1* | 6/2005 | Lewis ................ H03K 19/1737 326/41 |
| 2008/0186644 A1 | 8/2008 | Migliavacca |
| 2008/0192396 A1 | 8/2008 | Zhou et al. |
| 2008/0203970 A1 | 8/2008 | Shen |
| 2008/0266739 A1* | 10/2008 | Migliavacca ........... G05F 1/571 361/91.1 |
| 2009/0085619 A1 | 4/2009 | Westwick et al. |
| 2009/0237850 A1 | 9/2009 | Wu et al. |
| 2010/0045117 A1* | 2/2010 | Hou ........................ H02H 3/24 307/130 |
| 2010/0118459 A1 | 5/2010 | Logiudice |

* cited by examiner

CIRCUIT PROTECTION

FIELD OF THE DISCLOSURE

The present disclosure relates to protection of a circuit from an input voltage, in particular, but not exclusively, the disclosure relates to the protection of a circuit from an input voltage that exceeds a power supply voltage, such as a battery voltage which can vary during the life of the battery.

BACKGROUND TO THE DISCLOSURE

An electronic circuit is powered using at least two voltage rails, one of which may typically be ground. The voltage rails define a range input signal levels over which the circuit can provide a desired operation. If the voltage of the input signal falls outside of this range, the operation of the circuit may be compromised, and the circuit may even be damaged. Therefore, there is a need to protect the circuit.

In a mobile phone there can be a need to process several analogue single-ended low frequency signals, which can be done by converting the analogue signals to the digital domain for the processing. The analogue signals can be multiplexed, enabling a single analogue-to-digital converter to be used for the conversion of all of the analogue signals. The analogue-to-digital converter can be integrated in a mixed signal integrated circuit operating from voltage rails established by a battery. However, some of the signals to be processed may originate outside of the mixed signal integrated circuit and have a voltage level outside of the operating range of the mixed signal integrated circuit. This circumstance can arise, for example, when the signal to be processed monitors battery charging or a back-up voltage. Such signals can be scaled down to a level within the normal operating range of the mixed signal integrated circuit, but may nevertheless still exceed the battery voltage when the battery is largely discharged. There is a need to provide circuit protection is this circumstance. In addition, there is a need to provide protection when different voltage sources are coupled to different inputs of a multiplexer, to preventing short circuiting between the different voltage sources.

The disclosure relates to improvements in circuit protection.

SUMMARY OF THE PREFERRED EMBODIMENTS

According to a first aspect, there is provided an apparatus for protecting a circuit from an input voltage, comprising:

a switchable element arranged to couple the input voltage to the circuit in response to a first control signal having a first value and to decouple the input voltage from the circuit in response to the first control signal having a second value;

a monitor stage arrange to compare a monitored voltage to a threshold; and a controller arranged to provide the first control signal to the switchable element, the first control signal having the first value when the monitored voltage is on one side of the threshold and the second value-when the monitored voltage is on the other side of the threshold; and wherein the first value is independent of the input voltage and the second value is equal to the input voltage.

According to a second aspect, there is provided a method of protecting a circuit from an input voltage, comprising:

coupling the input voltage to the circuit in response to a first control signal having a first value and decoupling the input voltage from the circuit in response to the first control signal having a second value;

comparing a monitored voltage to a threshold; and providing the first control signal, the first control signal having the first value when the monitored voltage is on one side of the threshold and the second value when the monitored voltage is on the other side of the threshold;

wherein the first value is independent of the input, voltage and the second value is equal to the input voltage.

Therefore, the switchable element may be switched on or off according to which side of the threshold the monitored voltage is on. The first control signal may be switched between a first value for switching the switchable element on, that is coupling the input voltage to the circuit to fee protected, and a second value for switching the switchable element off, that is decoupling the input voltage from the circuit to be protected.

In the first and second aspects of the invention, the first value is independent of the input voltage. In other words, the first value may be constant, despite changes in the input voltage. This can ensure that the switchable element remains on despite fluctuations in the input voltage, and can ensure that the switchable element passes the input signal to the circuit in a linear manner. In contrast, if the first value were to vary when the input voltage varied, the resistance of the switchable element when passing the input signal can vary dependent on the input voltage, resulting in non-linear operation, and fluctuations in the input voltage may even cause the switchable element to switch off undesirably. These problems can be avoided by arranging the first value to be independent of the input voltage.

In the first and second aspects of the invention, the second value is equal to the input voltage. This can ensure that the switchable element remains off despite fluctuations in a supply voltage or despite fluctuations in the input voltage, as explained below.

The monitored voltage can be the input voltage. This enables the circuit to be protected when the input voltage falls outside of the acceptable voltage operating range of the circuit.

The apparatus may comprise a filter for filtering the input voltage, and the monitored voltage may be the filtered input voltage. This can enable a time varying input voltage to be smoothed and can prevent frequent opening and closing of the switchable element.

The monitored voltage can be a power supply voltage. This enables the circuit to be protected when the power supply voltage varies, which can cause the acceptable voltage operating range of the circuit to change and consequently cause the input voltage to fall outside of the acceptable voltage operating range of the circuit. This circumstance can occur when, for example, a power supply is switched off to conserve energy but the input voltage, for example a reference voltage or an input signal, remains present.

Therefore, according to a third aspect, there is provided an apparatus for protecting a circuit from an input voltage, comprising:

a switchable element arranged to couple and decouple the input voltage to/from the circuit in response to a first control signal;

a monitor stage arranged to compare a monitored voltage to a threshold; and a controller arranged to provide the first control signal to switch the switchable element according to which side of the threshold the monitored voltage is on;

wherein the monitored voltage is a power supply voltage.

According to a fourth aspect, there is provided a method of protecting a circuit from an input voltage, comprising:

comparing a monitored voltage to a threshold; and coupling and decoupling an input voltage to/from the circuit according to which side of the threshold the monitored voltage is on.

The apparatus for protecting a circuit from an input voltage according to the third aspect and the method of protecting a circuit from an input voltage according to the fourth aspect can comprise the/a first control signal having a first value for coupling the input voltage to the circuit and second value for decoupling the input voltage from the circuit.

The power supply voltage can be a battery voltage. This enables the circuit to be protected when the battery voltage reduces as the battery discharges.

The monitor stage may be arranged to generate an indication of whether the monitored voltage is above or below the threshold, and the controller may be arranged to switch the first control signal between the first value and second value in response to the indication. Likewise, the method may comprise generating an indication of whether the monitored voltage is above or below the threshold and switching the first control signal between the first value and second value in response to the indication. The use of the indication can facilitate reliable switching of the input switch despite fluctuations in the monitored voltage, for example by switching the indication between supply rail voltages.

The controller may comprise a controller first transistor and a controller second transistor, the controller first transistor having a source and a substrate coupled to an auxiliary input for receiving the input voltage, and the controller second transistor having a source and a substrate coupled to a voltage rail, a gate of the controller first transistor and a gate of the controller second transistor coupled to an indication input for receiving the indication, and a drain of the controller first transistor and a drain of the controller second transistor coupled to a control output for providing the first control signal, and wherein, dependent on a value of the indication, one of the controller first and second transistors is switched on and the other of the controller first and second transistors is switched off.

The switchable element may comprise a first transistor. This enables a low complexity implementation of the switchable element.

The first transistor can have a first source for receiving the input voltage, a first drain for coupling to the circuit to be protected, and a first gate coupled to the controller for receiving the first control signal. Such a configuration provides a low complexity implementation of the switchable element.

The first source can be coupled to a substrate, also generally known as a body, of the first transistor. This can protect against forward biasing of a p-n junction formed by the first source and the substrate of the first transistor, and therefore protect against current flowing in the substrate of the first transistor when voltages applied to the first transistor vary.

The apparatus may comprise a second transistor, wherein the first transistor is one of an n-channel metal oxide silicon, NMOS, transistor and a p-channel metal oxide silicon, PMOS, transistor, wherein the second transistor is the other of an NMOS transistor and a PMOS transistor, and wherein the second transistor has a second source coupled to the first source, a second drain coupled to the drain, and a second gate coupled to the controller for receiving from the controller a second control signal, and wherein the controller is arranged to control the first and second control signals such that the first and second transistors selectively both couple the input voltage to the circuit or both decouple the input voltage from the circuit. In this embodiment, the first end second transistors are coupled in parallel, and are controlled to be both on or both off. The use of the first and second transistors in combination enables the switchable element to pass a wide range of currents.

The apparatus may comprise a multiplexer, wherein the switchable element is part of the multiplexer, and wherein the controller comprises a first control stage for generating the first control signal having the first value, conditional on a select signal indicating selection of the input voltage from a plurality of voltage sources for output by the multiplexer, and having the second value otherwise. This enables the operation of the switch to be dependent on both the monitored voltage and on the select signal in combination.

The controller may comprise a second control stage for generating the second switch control such that coupling of the input voltage by the second transistor to the circuit to be protected is conditional on the select signal indicating selection of the input voltage from a plurality of voltage sources for output by the multiplexer. This enables the operation of the switch having both the first and second transistors to be dependent on both the monitored voltage and on the select signal in combination.

According to a further aspect, there is also provided an electronic device comprising the apparatus according to the first or third aspects and the circuit to be protected. The electronic device may be adapted for mobile wireless communication.

When the monitored voltage is the input voltage, the threshold may be smaller than a level of the input voltage at which the circuit can malfunction. This can enable the input voltage to be decoupled from the circuit before the input voltage reaches a level at which the circuit can malfunction.

When the monitored voltage is the power supply voltage, the threshold may be larger than a level of the power supply voltage at which the input voltage can cause the circuit can malfunction. This can enable the input voltage to be decoupled from the circuit before the power supply voltage falls to the level at which the input voltage can cause the circuit to malfunction.

BRIEF DESCRIPTION OF THE DRAWINGS

Preferred embodiments will now be described, by way of example only, with reference to the accompanying drawings, in which.

DETAILED DESCRIPTION OF PREFERRED EMBODIMENTS

Figure 1:
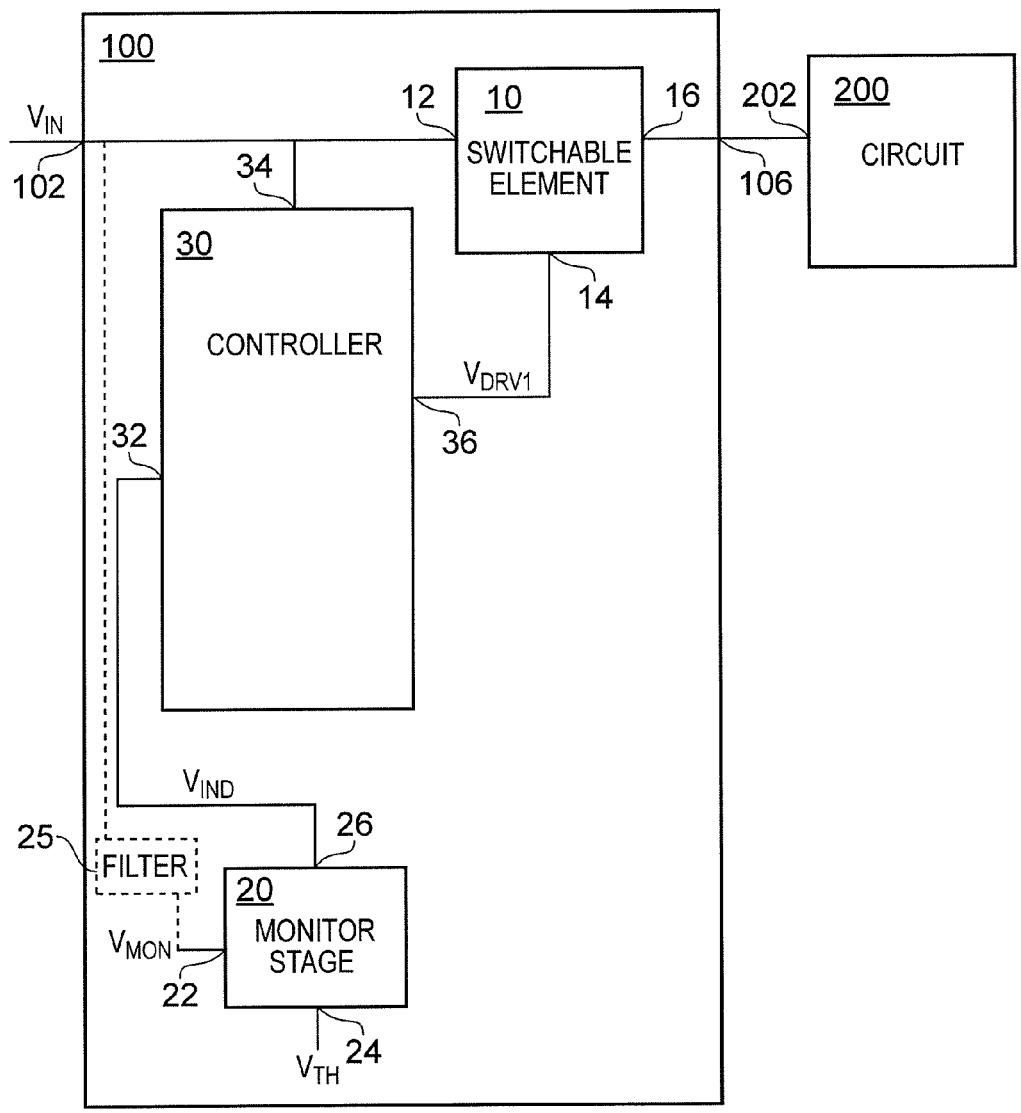
FIG. 1 is a block diagram of a circuit to be protected coupled to an apparatus for protecting the circuit.

Referring to FIG. 1, an apparatus 100 for protecting a circuit 200 is coupled to the circuit 200 to be protected. The apparatus ISO has an apparatus input 102 for an input voltage $V_{IN}$ and an apparatus output 106 coupled to an input 202 of the circuit 200 for delivering the input voltage $V_{IN}$ to the circuit 200. The apparatus 100 comprises a switchable element 10, a monitor stage 20 and a controller 30.

The switchable element 10 has a switch input 12 coupled to the apparatus input 102, and a switch output 16 coupled to the apparatus output 106. The switchable element 10 also has a switch first control port 14 for receiving a first control signal DRV1.

The monitor stage 20 has a monitor input 22 for receiving a voltage $V_{MON}$ to be monitored and a threshold input 24 for receiving a threshold voltage $V_{TH}$. Alternatively, the threshold voltage $V_{TH}$ may be provided within the monitor stage 20. The monitor stage 20 has a monitor output 28 for an indication signal $V_{IND}$ indicative of whether the monitored voltage $V_{MON}$ is above or below the threshold voltage $V_{TH}$. The monitor output 26 is coupled to an indication input 32 of the controller 30, and the controller 30 has a first control output 36 coupled to the switch first control port 14 of the switchable element 10 for delivering the first, control signal DRV1 to the switchable element 10.

The controller 30 provides the first control signal DRV1 to the switchable element 10, switching the first control signal DRV1 between a first value and a second value in response to the indication signal $V_{IND}$. The controller 30 has an auxiliary input 34 coupled to the apparatus input 102 for receiving the input voltage $V_{IN}$, and the second value of the first control signal DRV1 is equal to the input voltage $V_{IN}$, whereas the first value of the first control signal DRV1 is independent of the input voltage $V_{IN}$.

In response to the indication signal $V_{IND}$ indicating that the monitored voltage $V_{MON}$ is on one side of the threshold voltage $V_{TH}$, the controller 30 delivers to the switchable element 10 the first control signal DRV1 having the first value. In response to the first control signal DRV1 having the first value the switchable element 10 closes, that is, couples the input voltage $V_{IN}$ at the switch input 12 to the switch output 16, thereby coupling the input voltage $V_{IN}$ to the circuit 200 to be protected. In response to the indication signal $V_{IND}$ indicating that the monitored voltage $V_{MON}$ is on the other side of the threshold voltage $V_{TH}$, the controller 30 delivers to the switchable element 10 the first control signal DRV1 having the second value, and in response to the first control signal DRV1 having the second value the switchable element 10 switches off, that is, decouples the input voltage $V_{IN}$ at the switch input 12 from the switch output 16, thereby decoupling the input voltage $V_{IN}$ from the circuit 200 to be protected.

In a first example of the embodiment of FIG. 1, the circuit 200 to be protected operates from voltage rails at a first supply voltage $V_{DD}$ and a second supply voltage $V_{SS}$ lower than the first supply voltage $V_{DD}$, and the monitored voltage $V_{MON}$ is the input voltage $V_{IN}$. In addition, the threshold voltage $V_{TH}$ is around $V_{SS}$–0.7 volts, for example –0.7V if the second supply voltage $V_{SS}$ is at 0V, this being a lower limit of the input voltage $V_{IN}$ for acceptable operation of the circuit 200. In this example, if the input voltage $V_{IN}$ is above the threshold voltage $V_{TH}$, the input voltage $V_{IN}$ is coupled to the circuit 200, and if the input voltage $V_{IN}$ H falls below the threshold voltage $V_{TH}$, the input voltage $V_{IN}$ is decoupled from the circuit 200.

In a variation of this first example, the threshold voltage $V_{TH}$ is around $V_{DD}$+0.7 volts, this being an upper limit of the input voltage $V_{IN}$ for acceptable operation of the circuit 200. In this example, if the input voltage $V_{IN}$ is above the threshold voltage $V_{TH}$, the input voltage $V_{IN}$ is decoupled from the circuit 200, and if the input voltage $V_{IN}$ falls below the threshold voltage $V_{TH}$, the input voltage $V_{IN}$ is coupled to the circuit 200.

In another variation of this first example, the first supply voltage $V_{DD}$ is lower than the second supply voltage $V_{SS}$. For example, the second supply voltage $V_{SS}$ may be 0V and the first supply voltage $V_{DD}$ may be negative. In addition, the threshold voltage $V_{TH}$ may be around $V_{DD}$–0.7 volts, for example –5.5V if the first supply voltage $V_{DD}$ is –4.8V, this being a lower limit of the input voltage $V_{IN}$ for acceptable operation of the circuit 200. In this example, if the input voltage $V_{IN}$ is above the threshold voltage $V_{TH}$, the input voltage $V_{IN}$ is coupled to the circuit 200, and if the input voltage $V_{IN}$ falls below the threshold voltage $V_{TH}$, the input voltage $V_{IN}$ is decoupled from the circuit 200.

In another variation of this first example, in which the first supply voltage $V_{DD}$ is lower then the second supply voltage $V_{SS}$. For example, the second supply voltage $V_{SS}$ may be 0V and the first supply voltage $V_{DD}$ may be negative. The threshold voltage $V_{TH}$ may be around $V_{SS}$+0.7 volts, for example 0.7V if the second supply voltage $V_{SS}$ is 0V, this being an upper limit of the input voltage $V_{IN}$ for acceptable operation of the circuit 200. In this example, if the input voltage $V_{IN}$ below the threshold voltage $V_{TH}$, the input voltage $V_{IN}$ is coupled to the circuit 200, and if the input voltage $V_{IN}$ is above the threshold voltage $V_{TH}$, the input voltage $V_{IN}$ is decoupled from the circuit 200.

If the input voltage $V_{IN}$ is a time varying signal, the apparatus 100 may comprise a filter 25 for filtering the input voltage $V_{IN}$, and the monitored voltage $V_{MON}$ may be the filtered input voltage $V_{IN}$). This variation is illustrated using a dashed line in FIG. 1 by the filter 25 coupled between the apparatus input 102 and the monitor input 22.

In a second example of the embodiment of FIG. 1, the circuit 200 to be protected operates from voltage rails at the first and second supply voltages $V_{DD}$ and $V_{SS}$, with $V_{DD}$ being a battery voltage $V_{BAT}$ and $V_{SS}$ being at 0V, and the monitored voltage $V_{MON}$ may be the battery voltage $V_{BAT}$. The threshold voltage $V_{TH}$ may be, for example, around 2.3V, this threshold being a lower limit of the battery voltage $V_{BAT}$ for acceptable operation of the circuit 200. In this example, if the battery voltage $V_{BAT}$ is above the threshold voltage $V_{TH}$, the input voltage $V_{IN}$ is coupled to the circuit 200, and if the battery voltage $V_{BAT}$ falls below the threshold voltage $V_{TH}$, the input voltage $V_{IN}$ is decoupled from the circuit 200.

In this second example, the battery voltage $V_{BAT}$ is assumed to be positive with respect to the second supply voltage $V_{SS}$. Alternatively, if the battery voltage $V_{BAT}$ is negative with respect to the second supply voltage $V_{SS}$, the threshold voltage $V_{TH}$ may be, for example, around –2.3V, this threshold being an upper limit of the negative battery voltage $V_{BAT}$ for acceptable operation of the circuit 200. In this example, if the battery voltage $V_{BAT}$ is below, that is more negative than, the threshold voltage $V_{TH}$, the input voltage $V_{IN}$ is coupled to the circuit 200, and if the battery voltage $V_{BAT}$ rises above, that is becomes less negative than, the threshold voltage $V_{TH}$, the input voltage $V_{IN}$ is decoupled from the circuit 200.

Figure 2:
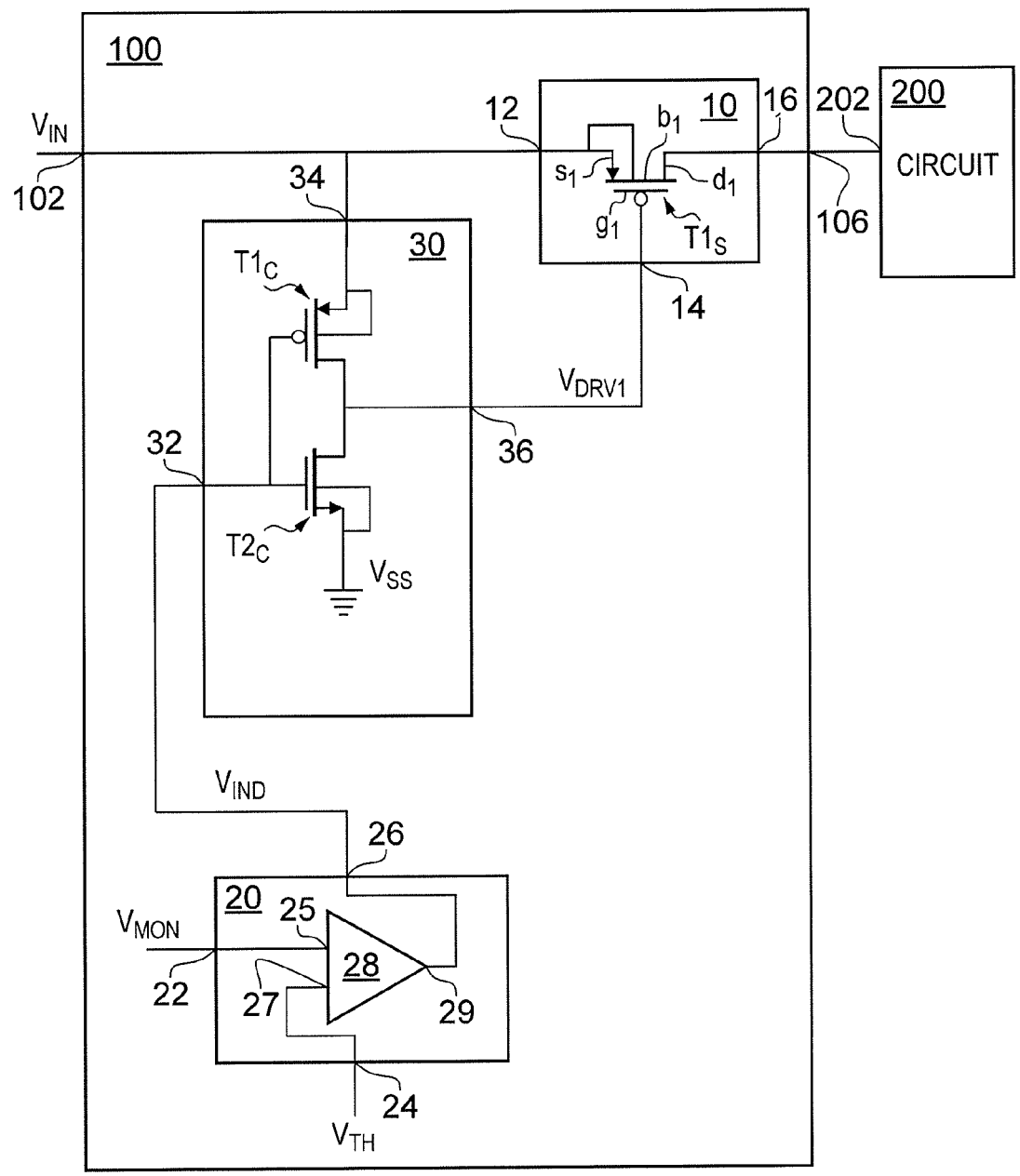
FIG. 2 is a block diagram of a circuit to be protected coupled to an apparatus for protecting the circuit.

The embodiment of FIG. 2 is identical to the embodiment of FIG. 1, but illustrates additionally an implementation of the switchable element 10, the monitor stage 20 and the controller 30.

In FIG. 2, the switchable element 10 comprises a switch first transistor $T1_S$ which is, in this example, a p-channel metal oxide semiconductor (PMOS) transistor having a first source $s_1$ coupled to a first substrate $b_1$ of the switch first transistor $T1_S$ and coupled to the switch input 12 for receiving the input voltage $V_{IN}$, a first drain $d_1$ coupled to the switch output 16, and a first gate $g_1$ coupled to the switch first control port 14. The monitor stage 20 comprises a comparator 28 having a comparator first input 28 coupled to the monitor input 22, a comparator second input 27 coupled to the threshold input 24, and a comparator output 23 coupled to the monitor output 26. The comparator 28 may operate from the voltage rails at the first and second supply voltages $V_{DD}$ and $V_{SS}$, and therefore the indication signal $V_{IND}$ may switch between the first and second supply voltages $V_{DD}$ and $V_{SS}$. In particular, if the first supply voltage $V_{DD}$ is the battery voltage $V_{BAT}$ and the second supply voltage $V_{SS}$ is 0V, the indication signal $V_{IND}$ may switch between the battery voltage $V_{BAT}$ and 0V.

In FIG. 2, the controller 30 comprises a controller first transistor $T1_C$ and a controller second transistor $T2_C$, which are, in this example, respectively a PMOS transistor and an n-channel metal oxide semiconductor (NMOS) transistor. The controller first transistor $T1_C$ has a source coupled to a substrate of the controller first transistor $T1_C$ and coupled to the auxiliary input 34 for receiving the input voltage $V_{IN}$, which for this implementation is assumed to have a positive value, a drain coupled to a drain of the controller second transistor $T2_C$, and a gate coupled to the indication input 32. The controller second transistor $T2_C$ has a source coupled to a substrate of the controller second transistor $T2_C$ and coupled to a voltage rail $V_{SS}$ at 0V, that is ground, and a gate coupled to the indication input 32. The drains of the controller first transistor $T1_C$ and the controller second transistor $T2_C$ are coupled to the first control output 36. In operation, when the indication signal $V_{IND}$ has a relatively high value, such as the first supply voltage $V_{DD}$ which can be positive with respect to 0V, the controller first transistor $T1_C$ is switched off, that is disabled from conducting between its source and drain, and the controller second transistor $T2_C$ is switched on, that is enabled to conduct between its source and drain. Consequently, the first control signal DRV1, that is the voltage at the first control output 36, is 0V and the switch first transistor $T1_S$ is switched on, thereby coupling the input voltage $V_{IN}$ to the circuit 200. When indication signal $V_{IND}$ has a relatively low value, such as $V_{SS}$, the controller first transistor $T1_C$ is switched on, that is enabled to conduct between its source and drain, and the controller second transistor $T2_C$ is switched off, that is disabled from conducting between its source and drain. Consequently, the voltage at the first control output 36 is equal to the input voltage $V_{IN}$ and the switch first transistor $T1_S$ is switched off, thereby decoupling the input voltage $V_{IN}$ from the circuit 200. By making the voltage at the first gate $g_1$ of the switch first transistor $T1_S$ equal to the input voltage $V_{IN}$, it can be ensured that the voltage difference between first source $s_1$ and the first gate $g_1$ is zero, and therefore that the switch first transistor $T1_S$ is switched off, thereby decoupling the input voltage $V_{IN}$ from the circuit 200, regardless of the first and second supply voltages $V_{DD}$ and $V_{SS}$.

Figure 3A:
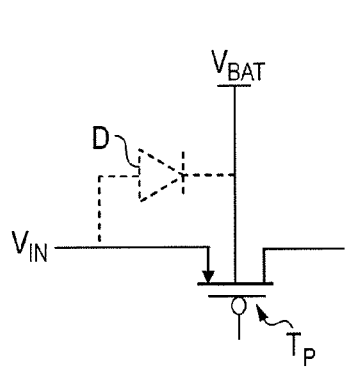
FIG. 3 is a schematic representation of a PMOS transistor.
Figure 3B:
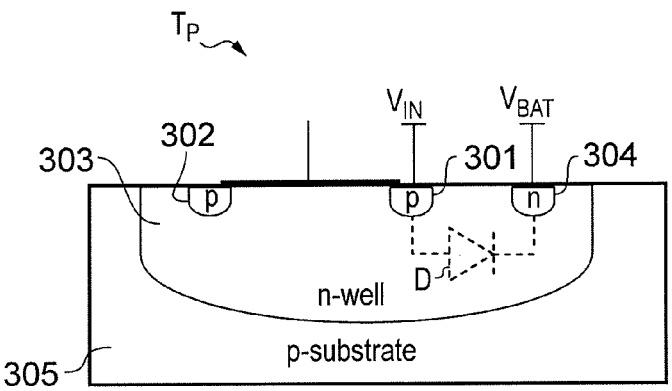

FIG. 3(*a*) illustrates a circuit schematic symbol of a PMOS transistor $T_P$ with the input voltage $V_{IN}$ provided at its source, and with the battery voltage $V_{BAT}$ provided at its substrate. FIG. 3(*b*) illustrates a corresponding representation of the structure of the PMOS transistor $T_P$, with its source and drain represented by p-type regions, 301 and 302 respectively, embedded in an n-well region 303, and with its substrate represented by an n-type region 304 embedded in the n-well region 303. The n-well region 303 is supported by a p-type substrate 305. The p-type region 301 of the source and the n-type region 304 of the substrate form a p-n junction, as represented by the diode D symbol in FIGS. 3(*a*) and 3(*b*) using dashed lines. With a fully charged battery, the battery voltage $V_{BAT}$ exceeds the input voltage $V_{IN}$, and so the p-n junction is reversed biased and therefore is non-conducting. However, if the battery voltage $V_{BAT}$ falls to about 0.7V below the input voltage $V_{IN}$, the p-n junction will become forward biased and will conduct, such that current flows into the substrate region 304 of the PMOS transistor $T_P$ from an input device delivering the input voltage $V_{IN}$. Such a current can potentially damage, or degrade the operation of, the PMOS transistor $T_P$ and any other device coupled to the substrate of the PMOS transistor $T_P$. Also, in some applications, operation of the input device delivering the input voltage $V_{IN}$ can be compromised. For example, if the input device is a capacitor storing a back-up supply voltage, the flow of such a current can discharge the capacitor.

Such a problem is avoided in the implementation of the switchable element 10 in FIG. 2 by the coupling of the first source $s_1$ and first substrate $b_1$ of the switch first PMOS transistor $T1_S$, thereby ensuring that the p-n junction formed by the first source $s_1$ and first substrate $b_1$ cannot become forward biased, and therefore current cannot flow into the first substrate $b_1$ from the input device. Similarly, in FIG. 2 the source and substrate of the controller first PMOS transistor $T1_C$ are coupled together.

Figure 4A:
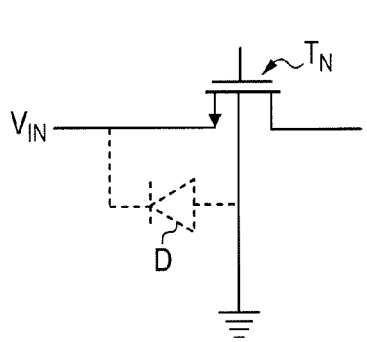
FIG. 4 is a schematic representation of an NMOS transistor.
Figure 4B:
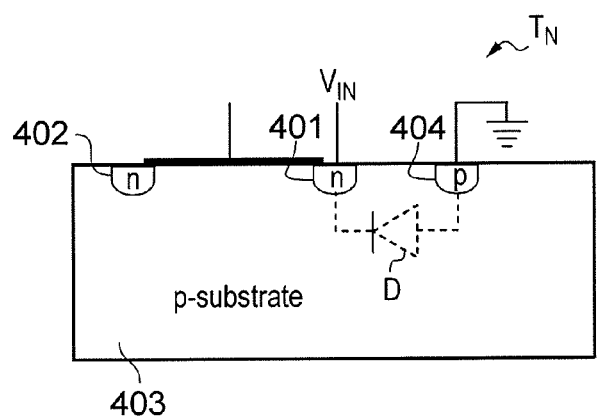

Corresponding circumstances can arise in an NMOS transistor. FIG. 4(*a*) illustrates a circuit schematic symbol of an NMOS transistor $T_N$ with the input voltage $V_{IN}$ provided at its source, and with its substrate coupled to ground. FIG. 4(*b*) illustrates a corresponding representation of the structure of the NMOS transistor $T_N$, with its source and drain represented by n-type regions, 401 and 402 respectively, embedded in a p-type substrate 403, and a p-type region 404 coupled to ground. The n-type region 401 of the source and the p-type region 404 coupled to ground form a p-n junction, as represented by the diode D symbol in FIGS. 4(*a*) and 4(*b*) using dashed lines. If the input voltage $V_{IN}$ is higher than ground, the p-n junction is reversed biased and therefore is non-conducting. If the input voltage $V_{IN}$ falls below about −0.7V, the p-n junction will become forward biased and will conduct, such that current flows from the p-type substrate 403 and through the p-type region 404 coupled to ground into an input device delivering, the input voltage $V_{IN}$. Such a current can potentially damage the input device and other circuitry that the current flows through. Again, such a problem can be avoided in embodiments of the apparatus 100 by coupling the source and substrate of NMOS transistors, as illustrated for the controller second transistor $T2_C$ in FIG. 2, thereby ensuring that the p-n junction formed by the source and substrate of the NMOS transistors cannot become forward biased, and therefore current cannot flow into the input device.

Figure 5:
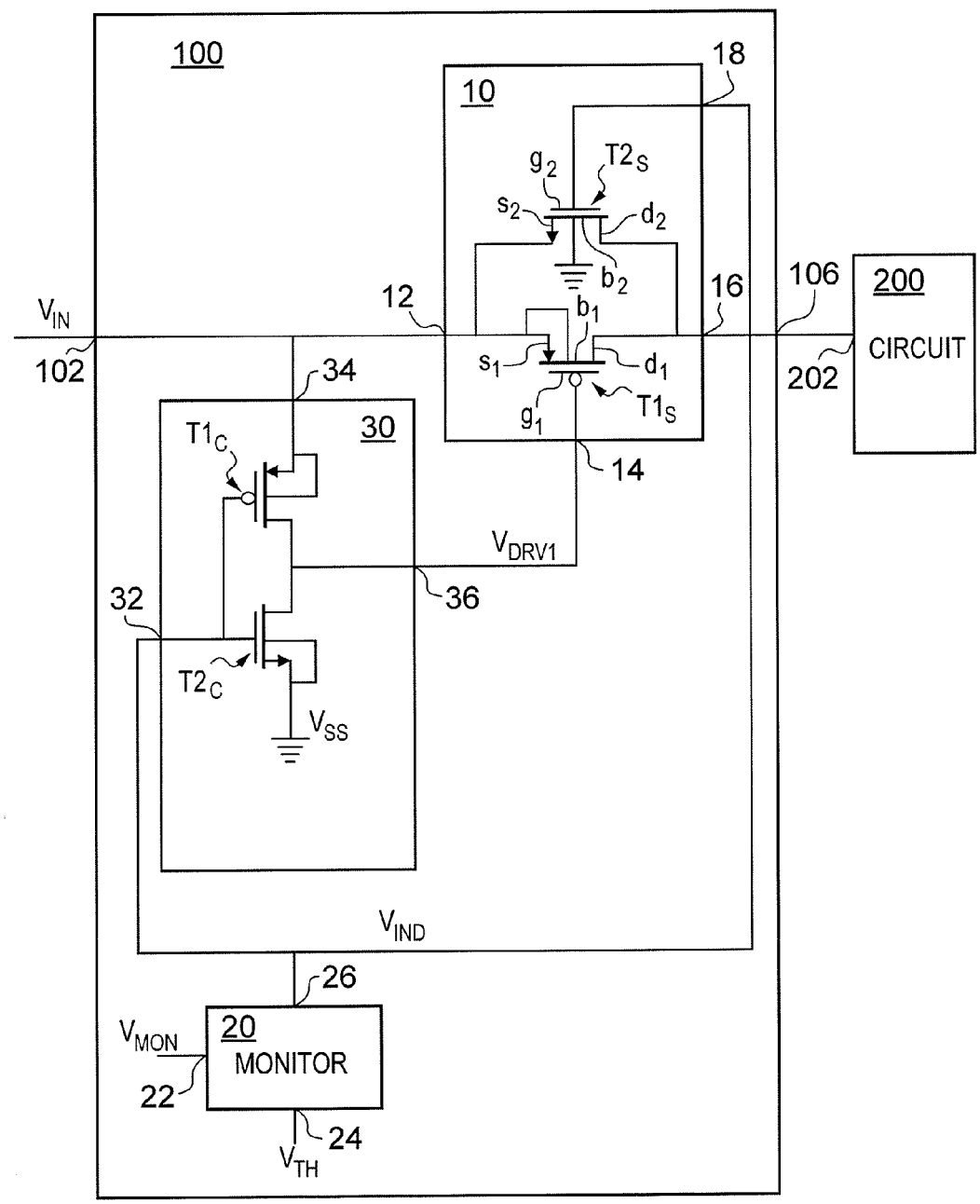
FIG. 5 is a block diagram of a circuit to be protected coupled to an apparatus for protecting the circuit.

The embodiment of FIG. 5 is identical to the embodiment of FIG. 2, except that it illustrates an alternative implementation of the switchable element 10. In FIG. 5, the switchable element 10 comprises the switch first transistor $T1_S$ having the first source $s_1$ coupled to the first substrate $b_1$ of the switch first transistor $T1_S$ and coupled to the switch input 12 for receiving the input voltage $V_{IN}$, the first drain $d_1$ coupled to the switch output 16, and the first gate $g_1$ coupled to the switch first control port 14. In addition, a switch second transistor $T2_S$, which in this example is an NMOS transistor, is coupled in parallel to the switch first transistor $T1_S$, having a second source $s_2$ coupled to the first source $s_1$ of the switch first transistor $T1_S$, a second drain $d_2$ coupled to the first drain $d_1$ of the switch first transistor $T1_S$, and a second substrate $b_2$ coupled to ground. A second gate $g_2$ of the switch second transistor $T2_S$ is coupled to the monitor output 26 for receiving the indication signal $V_{IND}$.

In operation, when indication signal $V_{IND}$ has a relatively high value, such as the first supply voltage $V_{DD}$ which can be positive with respect to 0V, the switch first transistor $T1_S$ is switched on, thereby coupling the input voltage $V_{IN}$, which is assumed to be positive, to the circuit 200, as explained in relation to the embodiment of FIG. 2. In addition, when indication signal $V_{IND}$ has a relatively high value, the switch second transistor $T2_S$ is switched on, thereby also coupling the input voltage $V_{IN}$ to the circuit 200. Conversely, when indication signal $V_{IND}$ has a relatively low value, such as the second supply voltage $V_{SS}$, both the switch first transistor $T1_S$ and the switch second transistor $T2_S$ are switched off, decoupling the input voltage $V_{IN}$ from the circuit 200.

Figure 6:
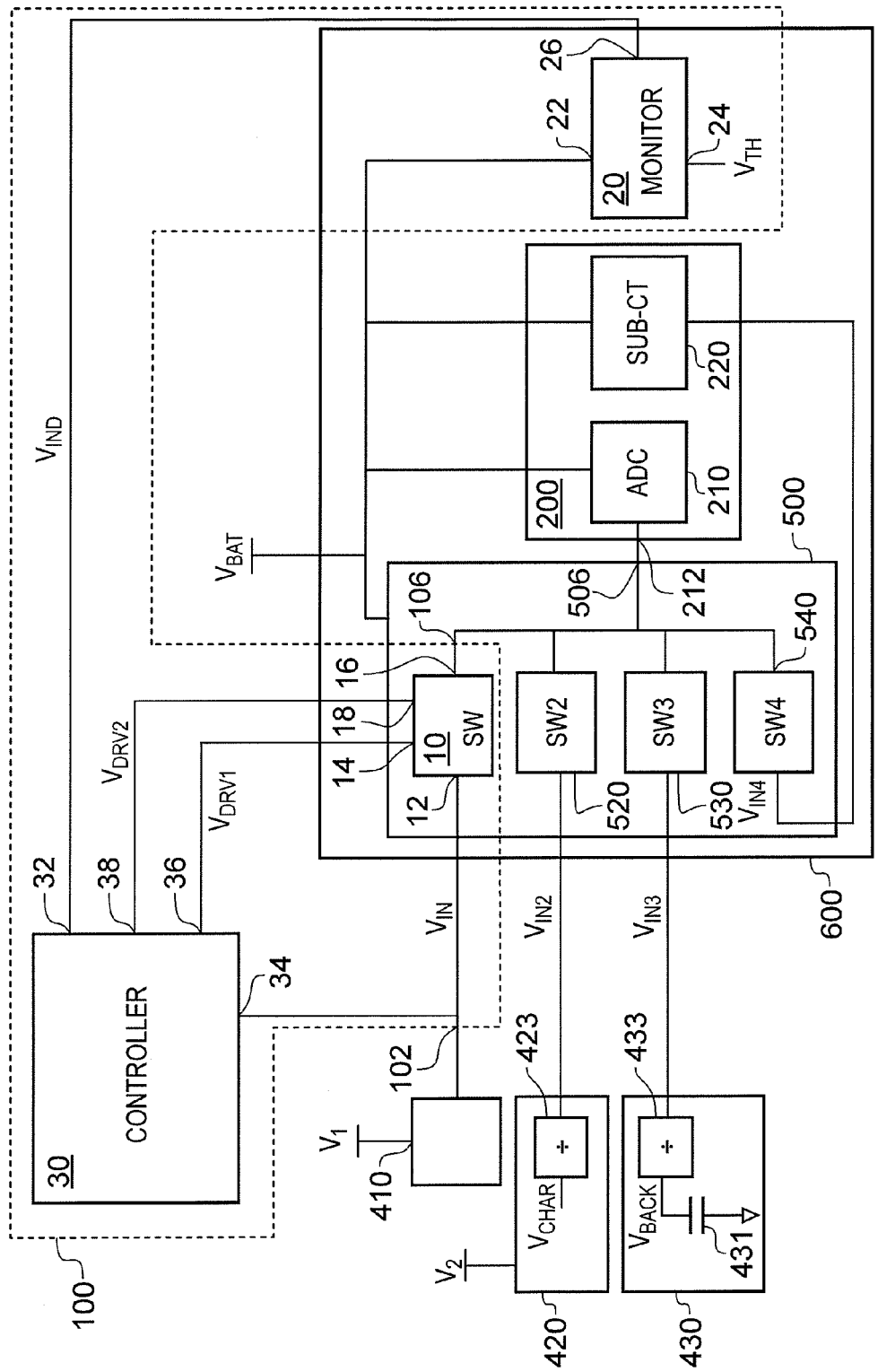
FIG. 6 is a block diagram of a circuit to be protected coupled to an apparatus for protecting the circuit.

The configuration of elements in FIG. 6 is applicable to, for example, a mobile phone. Referring to FIG. 6, the apparatus 100 for protecting the circuit 200 is denoted by a dashed line and comprises the switchable element 10, denoted SW, the monitor stage 20 and the controller 30. The circuit 200 comprises an analogue-to-digital converter (ADC) 210, which may be a general purpose ADC, and a sub-circuit 220. Other non-illustrated elements may also be present in the circuit 200, for example a processor coupled to the ADC 210 for processing digital signals delivered by the ADC 210. The switchable element 10 is part of a multiplexer 500 for multiplexing voltages supplied by a plurality of voltage sources. The multiplexer 500, the analogue-to-digital converter 210, the sub-circuit 220 and the monitor stage 20 are located in an integrated circuit 600 and are powered by a non-illustrated battery delivering the battery voltage $V_{BAT}$. The battery voltage $V_{BAT}$ may be, for example, 4.8V when the battery is fully charged.

A first voltage source 410 operates from a first voltage source supply voltage $V_1$, and is coupled to the apparatus input 102 for delivering the input voltage $V_{IN}$ to the switchable element 10 via the apparatus input 102 and the switch input 12. The first voltage source supply voltage $V_1$, and therefore the input voltage $V_{IN}$ is lower than the battery voltage $V_{BAT}$ when the battery is fully charged. The switch output 16 is coupled to the apparatus output 106. The apparatus output 106 is coupled to a multiplexer output 506 of the multiplexer 500. The multiplexer output 506 is coupled to an ADC input 212 of the ADC 210.

A second voltage source 420 operates from a second voltage source supply voltage $V_2$, and monitors a charging voltage $V_{CHAR}$ which is used for charging the battery. The second voltage source supply voltage $V_2$ and the charging voltage $V_{CHAR}$ can exceed the battery voltage $V_{BAT}$, even when the battery is fully charged. Therefore the second voltage source 420 comprises a first scaling stage 423 for applying scaling down to the charging voltage $V_{CHAR}$. An output of the first scaling stage 423 is coupled to an input of a second switch 520 of the multiplexer 500, and delivers to the input of the second switch 520 a second input voltage $V_{IN2}$. An output of the second switch 520 is coupled to the ADC input 212 via the multiplexer output 506.

A third voltage source 430 monitors a back-up voltage $V_{BACK}$ on a capacitor 431. The back-up voltage $V_{BACK}$ can exceed the battery voltage $V_{BAT}$, particularly when the battery becomes discharged. Therefore the third voltage source 430 comprises a second scaling stage 433 for applying scaling down to the back-up voltage $V_{BACK}$. An output of the second scaling stage 433 is coupled to an input of a third switch 530 of the multiplexer 500, and delivers to the input of the third switch 530 a third input voltage $V_{IN3}$. An output of the third switch 530 is coupled to the ADC input 212 via the multiplexer output 506.

The sub-circuit 220, which is powered by the battery voltage $V_{BAT}$, has an output coupled to an input of a fourth switch 540 of the multiplexer 500, and delivers to the input of the fourth switch 540 a fourth input voltage $V_{IN4}$. An output of the fourth switch 540 is coupled to the ADC input 212 via the multiplexer output 506.

The switchable element 10 in the embodiment of FIG. 6 is operated in response to the controller 30 and the monitor stage 20 in order to protect the circuit 200 from the input voltage $V_{IN}$ when the battery voltage $V_{BAT}$ falls below the threshold voltage $V_{TH}$ as described above in relation to FIGS. 1, 2, 3 and 5. Any or all of the second, third and fourth switches 520, 530, 540 may have an identical structure to the switchable element 10 and be controlled in a corresponding manner in order to provide protection to the circuit 200 if any of the second, third and fourth input voltages $V_{IN2}$, $V_{IN3}$, $V_{IN4}$ can exceed the battery voltage $V_{BAT}$ by an amount that can potentially cause damage or malfunctioning of the circuit 200. However in order to minimise complexity, it is not necessary to make provision for controlling, in response to a monitored voltage, those of the second, third and fourth switches 520, 530, 540 for which the second, third or fourth input voltages $V_{IN2}$, $V_{IN3}$, $V_{IN4}$ cannot fall outside of an acceptable voltage operating range of the circuit 200.

Besides protecting the circuit 200, the embodiment of FIG. 6 can also provide protection to the second and third voltage sources 420, 430 and the sub-circuit 220. By ensuring that the switchable element 10 remains off when the battery voltage $V_{BAT}$ falls below the threshold voltage $V_{TH}$ as described above, current flow from the switchable element 10 into the second or third voltage sources 420, 430 or the sub-circuit 220 via the respective ones of the second, third and fourth switches 520, 530, 540 when any of these is switched on is prevented. In effect, by ensuring that the switchable element 10 remains off when the battery voltage $V_{BAT}$ falls below the threshold voltage $V_{TH}$, a short circuit between the first voltage source 410 and any of the second and third voltage sources 420, 430 or the sub-circuit 220 is prevented.

Figure 7:
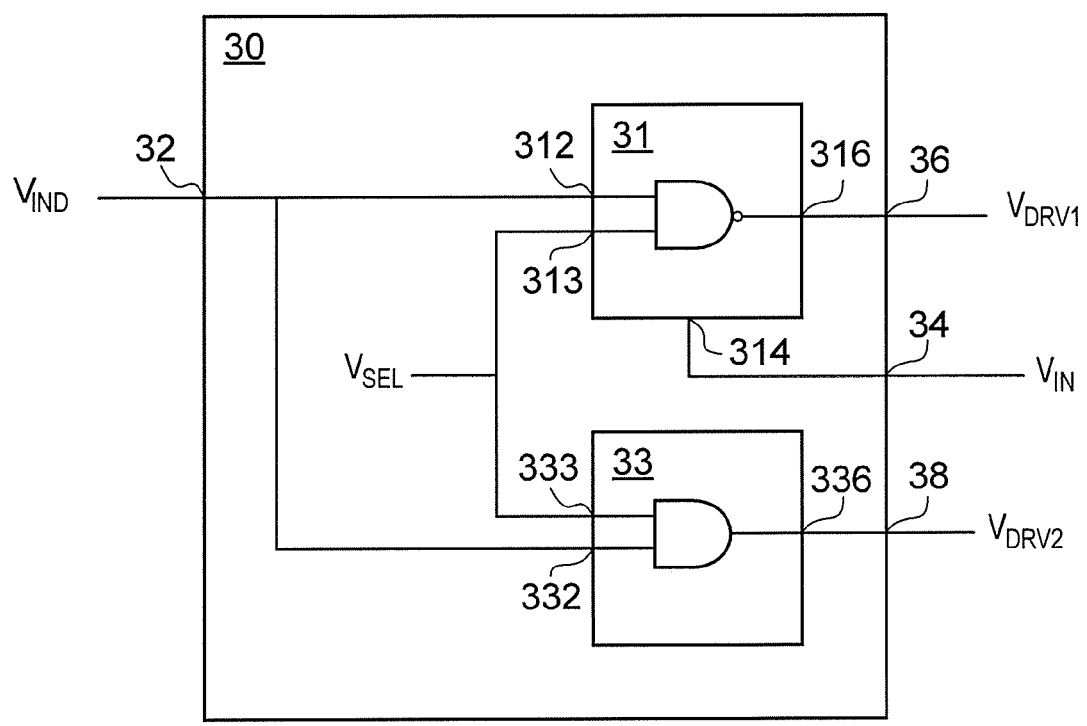
FIG. 7 is a block diagram of a controller.

The multiplexer 500 comprises a selection mechanism for selecting the input voltage $V_{IN}$ or one of the second, third and fourth input voltages $V_{IN2}$, $V_{IN3}$, $V_{IN4}$ to be delivered to the ADC input 212, as described below. FIG. 7 illustrates an embodiment of the controller 30 adapted for use with the multiplexer 500 comprising a selection mechanism, and for use with the embodiment of the switchable element 10 illustrated in FIG. 5.

Referring to FIG. 7, the controller 30 generates a select signal $V_{SEL}$ indicative of whether the input voltage $V_{IN}$ is to be coupled to the multiplexer output 506, for which the select signal $V_{SEL}$ may switch between the first and second supply voltages $V_{DD}$, $V_{SS}$. A first control stage 31 has a first control stage first input 312 coupled to the indication input 32 of the controller 30 for receiving the indication signal $V_{IND}$, a first control stage second input 313 arranged to receive the select signal $V_{SEL}$, a first control stage third input 314 coupled to the auxiliary input 34 of the controller 30 for receiving the input voltage $V_{IN}$, and a first control stage output 318 coupled to the first control output 36 of the controller 30 for delivering the first control signal DRV1. The first control stage 31 is arranged to deliver the first control signal DRV1 having the first value, conditional on the select signal $V_{SEL}$ indicating that the input voltage $V_{IN}$ is to be coupled to the multiplexer output 506 and the indication signal $V_{IND}$ indicating that the monitored voltage $V_{MON}$ is on one side of the threshold $V_{TH}$, and having the second value otherwise. The functionality of the first control stage 31 is represented by a NAND gate symbol in FIG. 7. For example, if the monitored voltage $V_{MON}$ is a battery voltage $V_{BAT}$ and has a positive value, this condition for delivering the first control signal DRV1 may require that the indication signal indicates that the monitored voltage $V_{MON}$ is above the threshold $V_{TH}$, where the threshold is 2.5V. In this example, the first control stage 31 may employ the input voltage $V_{IN}$ provided at the first control stage third input 314 to set the first value of the switch control signal DRV1 to be equal to the input voltage $V_{IN}$, and may set the second value to be equal to a power supply voltage, which may be ground. This may be arranged by employing the input voltage $V_{IN}$ as a power supply voltage for the first control stage 31.

A second control stage 33 has a second control stage first input 332 coupled to the indication input 32 of the controller 30 for receiving the indication signal $V_{IND}$, a second control stage second input 333 arranged to receive the select signal $V_{SEL}$, and a second control stage output 336 coupled to the second control output 38 of the controller 30 for delivering the second control signal DRV2. The second control stage 33 is arranged to control the second control signal DRV2 so that the switch second transistor $T2_S$ is switched off when the switch first transistor $T1_S$ is switched off, and is switched on when the switch first transistor $T1_S$ is switched on. Furthermore, the second control signal DRV2 may take values that are independent of the input voltage $V_{IN}$, for example, values that are equal to, or dependent on voltage supply values. The functionality of the second control stage 33 is represented by an AND gate symbol in FIG. 7, and in this example, the second control signal DRV2 is arranged so that the switch second transistor $T2_S$ is open when the indication signal $V_{IN}$ indicates that the monitored signal $V_{MON}$ is above the threshold $V_{IN}$ and the select signals $V_{SEL}$ indicates that the input voltage $V_{IN}$ is to be coupled to the multiplexer output 506, and is arranged so that the switch second transistor $T2_S$ is closed otherwise.

Figure 8:
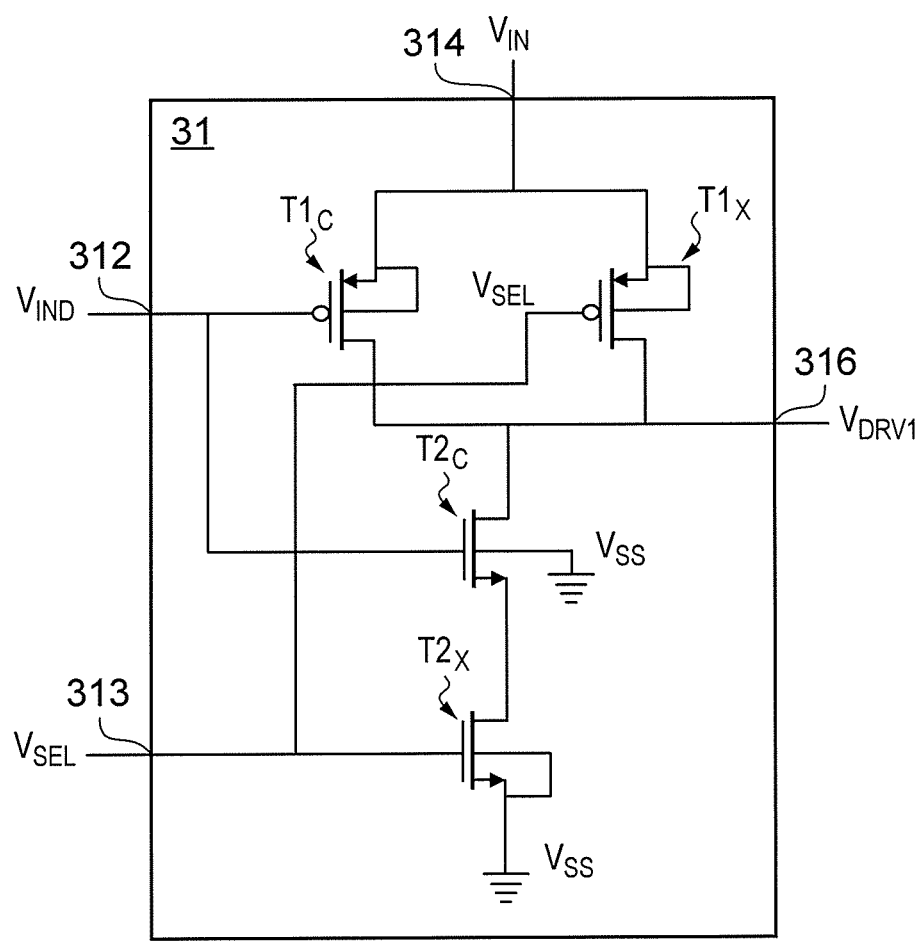
FIG. 8 is a block diagram of a first control stage.

FIG. 8 illustrates an implementation of the first control stage 31, and is similar to the controller 30 in FIGS. 2 and 5, comprising the controller first transistor $T1_C$ and the controller second transistor $T2_C$, but has in addition a controller first multiplex transistor $T1_X$ and a controller second multiplex transistor $T2_X$ for incorporating the select signal $V_{SEL}$. In this example, the controller first multiplex transistor $T1_X$ and the controller second multiplex transistor $T2_X$ are a PMOS transistor and an NMOS transistor respectively. The controller first transistor $T1_C$ has its source coupled to its substrate and coupled to the first control stage third input 314 for receiving the input voltage $V_{IN}$, which for this example is considered to have a positive value. The drain of the controller first transistor $T1_C$ is coupled to the first control stage output 316, and the gate of the controller first transistor $T1_C$ is coupled to the first control stage first input 312 for receiving the indication signal $V_{IND}$. The controller first multiplex transistor $T1_X$ has a source and a substrate coupled together and coupled to the source of the controller first transistor $T1_C$, and a drain coupled to the first control stage output 316. A gate of the controller first multiplex transistor $T1_X$ is coupled to the first control stage second input 313 for receiving the select signal $V_{SEL}$. The controller second transistor $T2_C$ has its drain coupled to the drain of the controller first transistor $T1_C$, its gate coupled to the first control stage first input 312 for receiving the indication signal $V_{IND}$, its substrate coupled to the second voltage supply rail $V_{SS}$, which in this example is ground, and its source coupled to a drain of the controller second multiplex transistor $T2_X$. The controller second multiplex transistor $T2_X$ has its gate coupled to the first control stage second input 313 for receiving the select signal $V_{SEL}$, and its substrate and source coupled together and to the second voltage supply rail $V_{SS}$.

In operation, when indication signal $V_{IND}$ has a relatively high value, the controller first transistor $T1_C$ is switched off that is disabled from conducting between its source and drain, and the controller second transistor $T2_C$ is switched on, that is enabled to conduct between its source and drain. Similarly, when the select signal $V_{SEL}$ has a relatively high value, the controller first multiplex transistor $T1_X$ is switched off, and the controller second multiplex transistor $T2_X$ is switched on. Conversely, when indication signal $V_{IND}$ has a relatively low value, the controller first transistor $T1_C$ is switched on, and the controller second transistor $T2_C$ is switched off. Similarly, when the select signal $V_{IND}$ has a relatively low value, the controller first multiplex transistor $T1_X$ is switched on and the controller second multiplex transistor $T2_X$ is switched off. Consequently, the first control signal $V_{DRV1}$ has a relatively low value, close to $V_{SS}$, only when the controller second transistor $T2_X$ and the controller second multiplex transistor $T2_X$ are both switched on, in which case the controller first transistor $T1_C$ and the controller first multiplex transistor $T1_X$ are both switched off. If either the controller second transistor $T2_C$ or the controller second multiplex transistor $T2_X$ is switched off, one or both of the controller first transistor $T1_C$ and the controller first multiplex transistor $T1_X$ is/are switched on, in which case the first control signal $V_{DRV1}$ has a relatively high value, equal to the input voltage $V_{IN}$.

Figure 9:
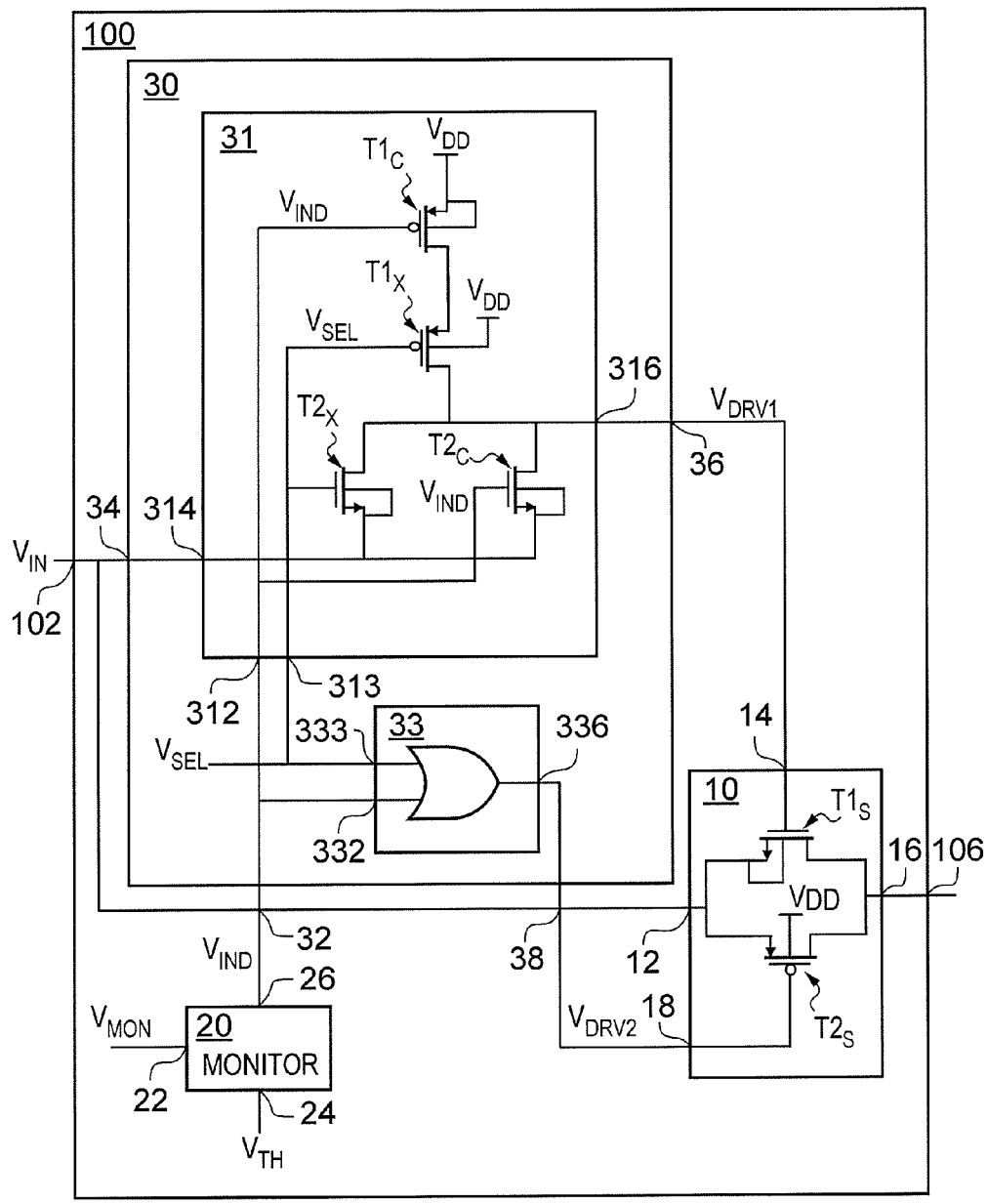
FIG. 9 is a block diagram of an apparatus for protecting a circuit.

FIG. 9 illustrates an embodiment of the apparatus 100 suitable for use in applications where the input voltage $V_{IN}$ can be negative with respect to ground. Elements of FIG. 9 that have a reference numeral that has been introduced in relation to FIGS. 1, 2 and 5 to 8 above are identical to the corresponding elements of those figures and are coupled in an identical arrangement, except where described below. By way of example, for the following description of the embodiment of FIG. 9, the monitored voltage $V_{MON}$ is the input voltage $V_{IN}$, the threshold $V_{TH}$ is a value which is negative with respect to ground, and the first supply voltage $V_{DD}$ is positive with respect to ground. The first supply voltage $V_{DD}$ may be, for example, the battery voltage $V_{BAT}$.

In the switchable element 10 of the embodiment of FIG. 9, the switch first transistor $T1_S$ is an NMOS transistor and the switch second transistor $T2_S$ is a PMOS transistor. The substrate of the switch second transistor $T2_S$ is coupled to the first supply voltage $V_{DD}$ and the substrate and the source of the switch first transistor $T1_S$ are coupled together.

In the first control stage 31 of the embodiment of FIG. 8, the controller first transistor $T1_C$ has its source coupled to its substrate and coupled to the first supply voltage $V_{DD}$. The drain of the controller first transistor $T1_C$ is coupled to the source of the controller first multiplex transistor $T1_X$, and the gate of the controller first transistor $T1_C$ is coupled to the first control stage first input 312 for receiving the indication signal $V_{IND}$. The controller first multiplex transistor $T1_X$ has its substrate coupled to the first supply voltage $V_{DD}$, and its drain coupled to the first control stage output 316 for delivering the first control signal $V_{DRV1}$. The gate of the controller first multiplex transistor $T1_X$ is coupled to the first control stage second input 313 for receiving the select signal $V_{SEL}$. The drain of the controller second multiplex transistor $T2_X$ is coupled to the first control stage output 316 for delivering the first control signal $V_{DRV1}$, and the gate of the controller second multiplex transistor $T2_X$ is coupled to the first control stage second input 313 for receiving the select signal $V_{SEL}$. The source and substrate of the controller second multiplex transistor $T2_X$ are coupled together and are coupled to the first control stage third input 314 for receiving the input voltage $V_{IN}$. The drain of the controller second transistor $T2_C$ is coupled to the drain of the controller second multiplex transistor $T2_X$, and the source and substrate of the controller second transistor $T2_C$ are coupled together and coupled to the first control stage third input 314 for receiving the input voltage $V_{IN}$. The gate of the controller second transistor $T2_C$ is coupled to the first control stage first input 312 for receiving the indication signal $V_{IND}$.

In operation, when indication signal $V_{IND}$ has a relatively high value, the controller first transistor $T1_C$ is switched off and the controller second transistor $T2_C$ is switched on. Similarly, when the select signal $V_{SEL}$ has a relatively high value, the controller first, multiplex transistor $T1_X$ is switched off and the controller second multiplex transistor $T2_X$ is switched on. Conversely, when indication signal $V_{IND}$ has a relatively low value, the controller first transistor $T1_C$ is switched on and the controller second transistor $T2_C$ is switched off. Similarly, when the select signal $V_{SEL}$ has a relatively low value, the controller first multiplex transistor $T1_X$ is switched on and the controller second multiplex transistor $T2_X$ is switched off. Consequently, the first control signal $V_{DRV1}$ has a relatively high value, close to $V_{DD}$, only when the controller first transistor $T1_C$ and the controller first multiplex transistor $T1_X$ are both switched on, in which case the controller second transistor $T2_C$ and the controller second multiplex transistor $T2_X$ are both switched off. If either the controller first transistor $T1_C$ or the controller first multiplex transistor $T1_X$ is switched off, one or both of the controller second transistor $T2_C$ and the controller second multiplex transistor $T2_X$ is/are switched on, in which case the first control signal $V_{DRV1}$ has a relatively low value, equal to the input voltage $V_{IN}$.

In the embodiment of FIG. 9, as in the embodiment of FIG. 7, the second control stage 33 is arranged to control the second control signal DRV2 so that the switch second transistor $T2_S$ is switched off when the switch first transistor $T1_S$ is switched off, and is switched on when the switch first transistor $T1_S$ is switched on. Furthermore, second control signal DRV2 may take values that are independent of the input voltage $V_{IN}$, for example, values that are equal to, or dependent on voltage supply values. The functionality of the second control stage 33 is represented by an OR gate symbol in FIG. 9.

Figure 10:
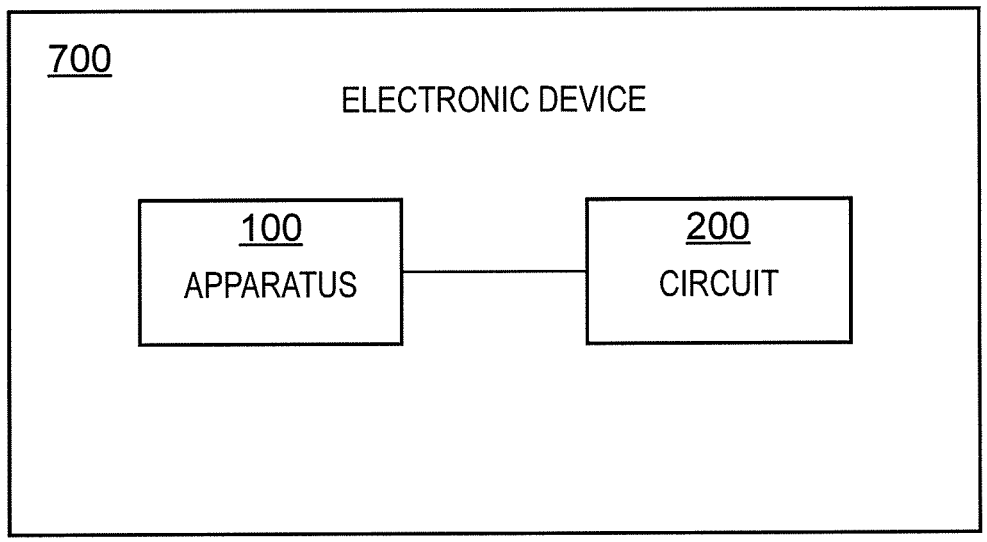
FIG. 10 is block diagram of an electronic device comprising a circuit to be protected coupled to an apparatus for protecting the circuit.

Referring to FIG. 10, an electronic device 700 comprises the circuit 200 to be protected coupled to the apparatus 100 for protecting the circuit 200. The electronic device 700 may be battery powered. The electronic device 700 may be, for example, an integrated circuit, a wireless communication device, a wireless navigation device or an entertainment device, particularly for mobile use.

Figure 11:
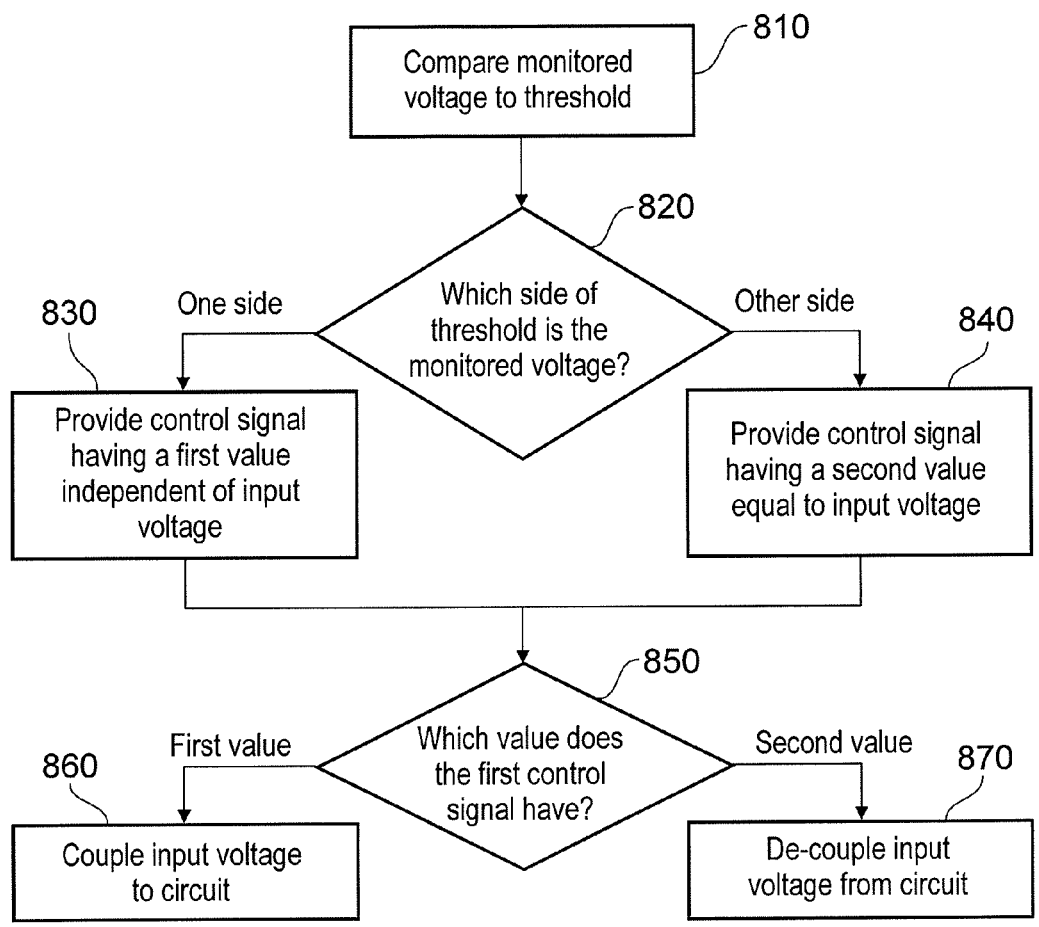
FIG. 11 is a flow chart illustrating a method of protecting a circuit.

Referring to FIG. 11, a method of protecting the circuit 200 comprises, at step 810, comparing the monitored voltage $V_{MON}$ on to the threshold voltage $V_{TH}$. At step 820, it is determined which side of the threshold voltage $V_{TH}$ the monitored voltage $V_{MON}$ is on. If the monitored voltage $V_{MON}$ is on one side of the threshold voltage $V_{TH}$, flow proceeds to step 830 at which the first control signal DRV1 is provided having the first value which is independent of the input voltage $V_{IN}$. Alternatively, if the monitored voltage $V_{MON}$ is on the other side of the threshold voltage $V_{TH}$, flow proceeds to step 840 at which the first control signal DRV1 is provided having the second value which is equal to the input voltage $V_{IN}$. From steps 830 and 840 flow proceeds to step 850 where an assessment of the value of the first control signal DRV1 is made. In response to the first control signal DRV1 having the first value, flow proceeds to step 860 at which the input voltage $V_{IN}$ is coupled to the circuit 200. Alternatively, in response to the first control signal DRV1 having the second value, flow proceeds to step 870 at which the input voltage $V_{IN}$ is decoupled from the circuit 200. Following steps 860 and 870, flow returns to step 810.

In a variation of the method of protecting the circuit 200 illustrated in FIG. 11, step 850 may be omitted, in which case the flow may proceed directly from step 830 to step 860, and from step 840 to step 870.

Although embodiments have been described which use PMOS and/or NMOS transistors, the skilled person will understand that PMOS and NMOS and transistors may be interchanged, depending on the relative values of the first and second supply voltages $V_{DD}$, $V_{SS}$ and the input voltage $V_{IN}$.

The threshold voltage $V_{TH}$ may be generated by, for example, a bandgap reference circuit. Such a bandgap circuit may comprise a plurality of p-n junctions coupled in series for generating a reference voltage $V_{TH}$ exceeding the voltage that can be provided using a single p-n junction. Moreover, the threshold voltage $V_{TH}$ may be generated with hysteresis to prevent or reduce frequent switching of the switchable element 10 when the monitored voltage $V_{MON}$ on is close to the threshold voltage $V_{TH}$. Therefore, the value of the threshold voltage $V_{TH}$ may be decreased in response to the threshold voltage $V_{TH}$ increasing from below the threshold voltage $V_{TH}$ to above the threshold voltage $V_{TH}$, and may be increased in response to the threshold voltage $V_{TH}$ decreasing from above the threshold voltage $V_{TH}$ to below the threshold voltage $V_{TH}$. In this way, the threshold voltage $V_{TH}$ need not be a constant value, but may vary dependent on the monitored voltage $V_{MON}$.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. An apparatus for protecting a circuit operating from first and second supply voltages and having an operating range defined by the first and second supply voltages from an input voltage for the circuit outside the operating range, comprising:
   a switchable element arranged to couple the input voltage to the circuit in response to a first control signal having a first value and to decouple the input voltage from the circuit in response to the first control signal having a second value;
   a monitor stage arranged to compare a monitored voltage to a threshold;
   a controller arranged to provide the first control signal to the switchable element, the first control signal having the first value when the monitored voltage is on one side of the threshold and the second value when the monitored voltage is on the other side of the threshold; and
   a multiplexer, wherein the switchable element is part of the multiplexer, and wherein the controller comprises a first control stage for generating the first control signal having the first value, conditional on a select signal indicating selection of the input voltage from a plurality of voltages for output by the multiplexer and having the second value otherwise;
   wherein the first value is independent of the input voltage and the second value is equal to the input voltage;
   wherein the monitor stage is arranged to generate an indication of whether the monitored voltage is above or below the threshold, and the controller is arranged to switch the first control signal between the first value and second value in response to the indication; and
   wherein the controller comprises a controller first transistor and a controller second transistor, the controller first transistor having a source and a substrate coupled to an auxiliary input for receiving the input voltage, and the controller second transistor having a source and a substrate coupled to a voltage rail, a gate of the controller first transistor and a gate of the controller second transistor coupled to an indication input for receiving the indication, and a drain of the controller first transistor and a drain of the controller second transistor coupled to a control output for providing the first control signal, and wherein, dependent on a value of the indication, one of the controller first and second transistors is switched on and the other of the controller first and second transistors is switched off.

2. An apparatus as claimed in claim 1, wherein the monitored voltage is the input voltage.

3. An apparatus as claimed in claim 2, comprising a filter for filtering the input voltage, and wherein the monitored voltage is the filtered input voltage.

4. An electronic device comprising the apparatus as claimed in claim 2 and the circuit to be protected, wherein the threshold is smaller than a level of the input voltage at which the circuit can malfunction.

5. An electronic device as claimed in claim 4, wherein the electronic device is adapted for mobile wireless communication.

6. An apparatus as claimed in claim 1, wherein the monitored voltage is a power supply voltage.

7. An electronic device comprising the apparatus as claimed in claim 6 and the circuit to be protected, wherein the threshold is larger than a level of the power supply voltage at which the input voltage can cause the circuit to malfunction.

8. An electronic device as claimed in claim 7, wherein the electronic device is adapted for mobile wireless communication.

9. An apparatus as claimed in claim 1, wherein the monitored voltage is a battery voltage.

10. An apparatus as claimed in claim 1, wherein the switchable element comprises a first transistor.

11. An apparatus as claimed in claim 10, wherein the first transistor has a first source for receiving the input voltage, a first drain for coupling to the circuit, and a first gate coupled to the controller for receiving the first control signal.

12. An apparatus as claimed in claim 11, wherein the first source is coupled to a substrate of the first transistor.

13. An apparatus as claimed in claim 11, comprising a second transistor, wherein the first transistor is one of an n-channel metal oxide silicon, NMOS, transistor and a p-channel metal oxide silicon, PMOS, transistor, wherein the second transistor is the other of an NMOS transistor and a PMOS transistor, and wherein the second transistor has a second source coupled to the first source, a second drain coupled to the first drain, and a second gate coupled to the controller for receiving from the controller a second control signal, and wherein the controller is arranged to control the first and second control signals such that the first transistor and second transistor selectively both couple the input voltage to the circuit or both decouple the input voltage from the circuit.

14. An apparatus as claimed in claim 11, comprising a second transistor, wherein the first transistor is one of an n-channel metal oxide silicon, NMOS, transistor and a p-channel metal oxide silicon, PMOS, transistor, wherein the second transistor is the other of an NMOS transistor and a PMOS transistor, and wherein the second transistor has a second source coupled to the first source, a second drain coupled to the first drain, and a second gate coupled to the monitor stage for receiving the indication, and wherein, dependent on the indication, the first transistor and second transistor selectively both couple the input voltage to the circuit or both decouple the input voltage from the circuit.

15. An apparatus as claimed in claim 1, wherein the controller comprises a second control stage for generating a second control signal such that coupling of the input voltage by a second transistor to the circuit to be protected is conditional on the select signal indicating selection of the input voltage from the plurality of voltages for output by the multiplexer.

16. An electronic device comprising the apparatus as claimed in claim 1 and the circuit to be protected.

17. An electronic device as claimed in claim 16, wherein the electronic device is adapted for mobile wireless communication.

18. An apparatus as claimed in claim 1, wherein the source of the controller second transistor is coupled to the voltage rail directly.

19. An apparatus as claimed in claim 1, wherein the source of the controller second transistor is coupled to the voltage rail by means of a multiplex transistor having a drain coupled to the source of the controller second transistor, a gate coupled to the first control stage for receiving the select signal, and a source and substrate coupled together and to the voltage rail.

20. A method of protecting a circuit operating from first and second supply voltages and having an operating range defined by the first and second supply voltages from an input voltage for the circuit outside the operating range, comprising:
   comparing a monitored voltage to a threshold; and
   providing a first control signal, the first control signal having a first value when the monitored voltage is on one side of the threshold and a second value when the monitored voltage is on the other side of the threshold by generating an indication of whether the monitored voltage is above or below the threshold, and switching the first control signal between the first value and the second value in response to the indication;

coupling the input voltage to the circuit in response to the first control signal having the first value and decoupling the input voltage from the circuit in response to the first control signal having the second value;

wherein the first value is independent of the input voltage and the second value is equal to the input voltage; and switching on, dependent on a value of the indication, one of a controller first transistor and a controller second transistor and switching off the other of the controller first and second transistors, the controller first transistor having a source and a substrate coupled to an auxiliary input for receiving the input voltage, the controller second transistor having a source and a substrate coupled to a voltage rail, a gate of the controller first transistor and a gate of the controller second transistor coupled to an indication input for receiving the indication, and a drain of the controller first transistor and a drain of the controller second transistor coupled to a control output for providing the first control signal, wherein a first control stage generates the first control signal having the first value, conditional on a select signal indicating selection of the input voltage from a plurality of voltages for output by a multiplexer and having the second value otherwise.

* * * * *

UNITED STATES PATENT AND TRADEMARK OFFICE
CERTIFICATE OF CORRECTION

PATENT NO. : 9,627,879 B2  
APPLICATION NO. : 13/990936  
DATED : April 18, 2017  
INVENTOR(S) : Zamprogno et al.

Page 1 of 1

It is certified that error appears in the above-identified patent and that said Letters Patent is hereby corrected as shown below:

In the Specification

In Column 1, Line 6, delete "voltage, in" and insert -- voltage. In --, therefor.

In Column 2, Line 8, delete "input, voltage" and insert -- input voltage --, therefor.

In Column 2, Line 14, delete "fee" and insert -- be --, therefor.

In Column 2, Line 20, delete "constant, despite" and insert -- constant despite --, therefor.

In Column 4, Line 6, delete "end second" and insert -- and second --, therefor.

In Column 5, Line 12, delete "ISO" and insert -- 100 --, therefor.

In Column 5, Line 26, delete "28" and insert -- 26 --, therefor.

In Column 6, Line 28, delete "then" and insert -- than --, therefor.

In Column 6, Line 35, delete "$V_{IN}$ below" and insert -- $V_{IN}$ is below --, therefor.

In Column 7, Line 16, delete "input 28" and insert -- input 25 --, therefor.

In Column 7, Line 18, delete "23" and insert -- 29 --, therefor.

In Column 11, Line 6, delete "318" and insert -- 316 --, therefor.

Signed and Sealed this  
Seventeenth Day of December, 2019

Andrei Iancu  
*Director of the United States Patent and Trademark Office*